United States Patent
Park

(10) Patent No.: US 10,513,250 B2
(45) Date of Patent: Dec. 24, 2019

(54) METHOD AND APPARATUS FOR PREVENTING PARKING MALFUNCTION DURING REMOTE START-UP

(71) Applicants: Hyundai Motor Company, Seoul (KR); Kia Motors Corporation, Seoul (KR)

(72) Inventor: Hyung-Bin Park, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 81 days.

(21) Appl. No.: 15/991,400

(22) Filed: May 29, 2018

(65) Prior Publication Data

US 2019/0176795 A1    Jun. 13, 2019

(30) Foreign Application Priority Data

Dec. 12, 2017   (KR) .......................... 10-2017-0170218

(51) Int. Cl.
*B60T 17/22* (2006.01)
*B60T 13/74* (2006.01)
*B60T 7/12* (2006.01)

(52) U.S. Cl.
CPC .......... *B60T 17/221* (2013.01); *B60T 13/746* (2013.01); *B60T 7/12* (2013.01); *B60T 13/741* (2013.01); *B60T 13/745* (2013.01); *B60T 2270/413* (2013.01)

(58) Field of Classification Search
CPC ........ B60T 17/221; B60T 13/746; B60T 7/12; B60T 13/745; B60T 13/741; B60T 2270/413
See application file for complete search history.

(56) References Cited

U.S. PATENT DOCUMENTS

| 9,428,159 B2 | 8/2016 | Heise et al. | |
| 2008/0024270 A1* | 1/2008 | Katagiri | ................. B60R 25/04 340/5.72 |
| 2014/0032031 A1* | 1/2014 | Okamura | ........... B62D 15/0285 701/23 |
| 2017/0197622 A1* | 7/2017 | Books | ............ B60W 30/18018 |

FOREIGN PATENT DOCUMENTS

| JP | 2010006299 A | 1/2010 |
| JP | 2011168257 A | 9/2011 |
| KR | 20090005721 A | 1/2009 |
| KR | 20110072878 A | 6/2011 |
| KR | 20170052356 A | 5/2017 |

* cited by examiner

*Primary Examiner* — Joseph J Dallo
(74) *Attorney, Agent, or Firm* — Mintz Levin Cohn Ferris Glovsky and Popeo, P.C.; Peter F. Corless

(57) ABSTRACT

A remote start-up operating method and a method for preventing parking malfunction during remote start-up is provided. The method includes determining whether a remote start-up ECU receives a remote start-up signal and determining whether the remote start-up ECU receives an electrical signal that indicates whether to operate a parking valve based on a position of a parking lever. An engine start-up signal is then transmitted to an engine ECU.

10 Claims, 5 Drawing Sheets

METHOD AND APPARATUS FOR PREVENTING PARKING MALFUNCTION DURING REMOTE START-UP

CROSS-REFERENCE TO RELATED APPLICATIONS

This application claims priority under 35 U.S.C. § 119 to Korean Patent Application No. 10-2017-0170218, filed on Dec. 12, 2017, the disclosure of which is incorporated herein by reference in its entirety.

BACKGROUND

1. Field of the Invention

The present invention relates to a method and an apparatus for operating remote start-up, and more particularly, to a parking valve and a remote start-up electronic control unit (ECU).

2. Description of the Related Art

Generally, when a driver turns off a vehicle and leaves the vehicle without engaging a parking lever to a parking stage and compressed air leaks, the vehicle is automatically parked regardless of an intention of a driver. That is, the vehicle is parked while pressure of a parking chamber drops to predetermined pressure or less and a parking spring is expanded.

However, when a vehicle is parked automatically due to leakage of the compressed air in the parking system on an inclined road surface and the driver operates remote a start-up of the vehicle, an engine is operated and while an air compressor is operated, the compressed air is generated and transmitted to the parking system and the compressed air compresses the parking spring of the parking chamber to release parking. A remote start-up ECU may receive no information regarding whether the parking valve operates based on the position of the parking lever. Accordingly, when force is applied from the outside, such as wind in the direction of an inclined surface or an impact against the vehicle occurs, the vehicle may move and an accident may occur.

SUMMARY

The present invention provides a method and an apparatus for preventing a parking malfunction during remote start-up by generating an electrical signal related to whether a parking valve is operated based on a position of a parking lever and the electrical signal is transmitted to a remote start-up ECU.

An exemplary embodiment of the present invention provides a method for preventing parking malfunction during remote start-up that may include: determining whether a remote start-up ECU receives a remote start-up signal; determining whether the remote start-up ECU receives an electrical signal that indicates whether to operate a parking valve based on a position of a parking lever; and transmitting, by the remote start-up ECU, an engine start-up signal to an engine ECU.

When the parking lever is disposed in a parking release position, the electrical signal may not be generated. Further, when the electrical signal is not generated, the remote start-up ECU may not transmit the engine start-up signal to the engine ECU even when receiving the remote start-up signal from a driver. When the parking lever is disposed in a parking operation position, the electrical signal may be generated and the electrical signal may be transmitted to the remote start-up ECU. Additionally, when the remote start-up ECU receives the remote start-up signal and the electrical signal, the remote start-up ECU may be configured to transmit the engine start-up signal to the engine ECU.

Another exemplary embodiment of the present invention provides an apparatus for preventing parking malfunction during remote start-up that may include: an electronic parking valve configured to generate an electrical signal related to whether a parking valve is operated based on a position of a parking lever; and a remote start-up ECU electrically wired with the electronic parking valve and configured to determine whether to transmit an engine start-up signal to an engine ECU based on whether a remote start-up signal is received from a driver and whether the electrical signal is received from the electronic parking valve.

The electronic parking valve may include a cam and a cam seat, and the cam may include a plunger, a spring, a positive electrode, and a negative electrode and in the cam seat, a plunger guide through which the plunger may pass may be machined. When the driver moves the parking lever for a parking operation and the plunger passes through an inlet of the plunger guide, the plunger may be pressed by the plunger guide and the pressed plunger presses the negative electrode to be in contact with the positive electrode and be electrically conducted. As a result, the electrical signal may be generated and transmitted to the remote start-up ECU.

Additionally, when the parking lever reaches a fixed position, the electrical signal may be continuously generated and transmitted to the remote start-up ECU while the parking lever maintains the position. When the remote start-up ECU receives the remote start-up signal and the electrical signal, the remote start-up ECU may be configured to transmit the engine start-up signal to the engine ECU.

As described above, according to the present invention, whether a parking valve operates based on a position of a parking lever may be generated as an electrical signal and the electrical signal may be transmitted to a remote start-up ECU, and whether remote start-up is available may be determined according to whether the remote start-up ECU receives the electrical signal.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION

Figure 1:
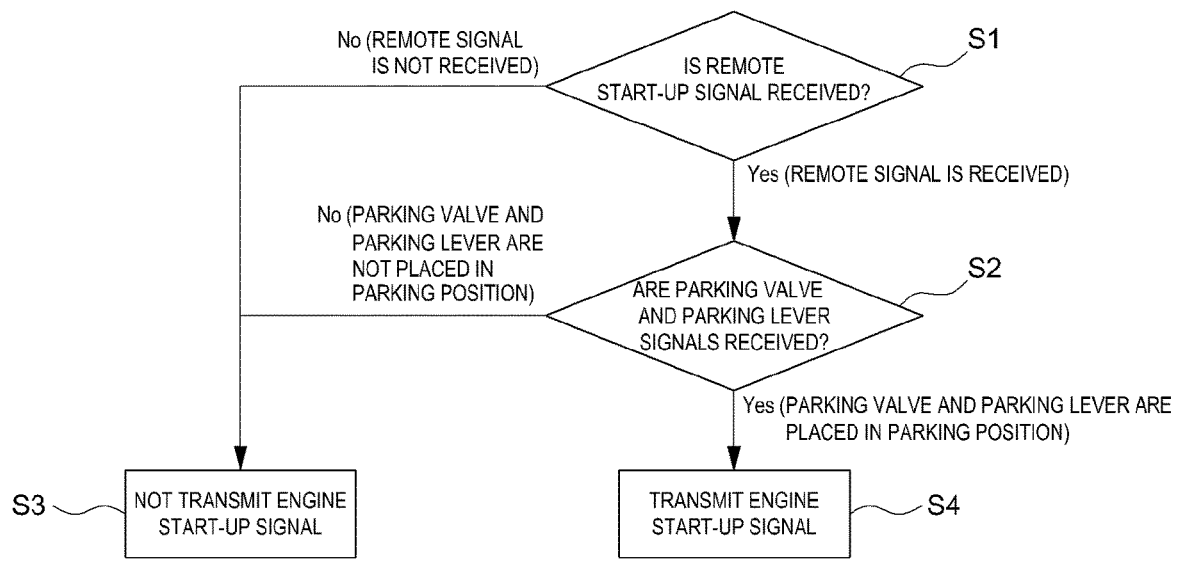
FIG. 1 illustrates a remote start-up control method included in a remote start-up ECU according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described in detail with reference to contents disclosed in the accompanying drawings. However, the present invention is not restricted or limited by exemplary embodiments. Like reference numerals presented in each drawing refer to elements that perform substantially the same functions.

Objects and effects of the present invention may be naturally appreciated or more clear by the following description and the objects and effects of the present invention are not limited only by the following disclosure. Further, in describing the present invention, a detailed explanation of known technologies associated with the present invention may be omitted to avoid unnecessarily obscuring the subject matter of the present invention.

FIG. 1 illustrates a remote start-up control method included in a remote start-up ECU of the present invention. The method described herein below may be executed by a controller (e.g., an ECU or an overall controller). Referring to FIG. 1, the remote start-up control method may include determining whether a remote start-up ECU 28 receives a remote start-up signal from a driver (S1), determining whether when the remote start-up ECU 28 receives the remote start-up signal, an electrical signal generated by a parking valve 24 and transmitted to the remote start-up ECU 28 is received based on a position of a parking lever 25 (S2), and transmitting an engine start-up signal to an engine ECU configured to operate an engine when the remote start-up ECU 28 receives the electrical signal (S4). When the remote start-up ECU 28 does not receive the remote start-up signal from a driver, the remote start-up ECU 28 may not transmit the engine start-up signal to the engine ECU (S3).

Further, when the parking lever 25 is disposed in a parking release position, the electrical signal may not be generated and the electrical signal may not be transmitted to the remote start-up ECU 28. Since the remote start-up ECU 28 may not receive the electric signal when the electrical signal is not generated, the electrical signal is not transmitted to the remote start-up ECU 28. Therefore, the remote start-up ECU 28 may be configured to determine that the parking lever 25 is not disposed in the parking operation position and the parking valve 24 is not operated to prevent transmission of the engine start-up signal to the engine ECU even when the remote start-up ECU 28 receives the remote start-up signal from the driver (S3).

When the parking lever 25 is disposed in the parking operation position, the electrical signal may be generated and the electrical signal may be transmitted to the remote start-up ECU 28. When the remote start-up ECU 28 (e.g., the controller) receives the electrical signal, the remote start-up ECU 28 may be configured to determine that the parking lever 25 is in the parking operation position and the parking valve 24 may be operated to transmit the engine start-up signal to the engine ECU (S4).

Figure 2:
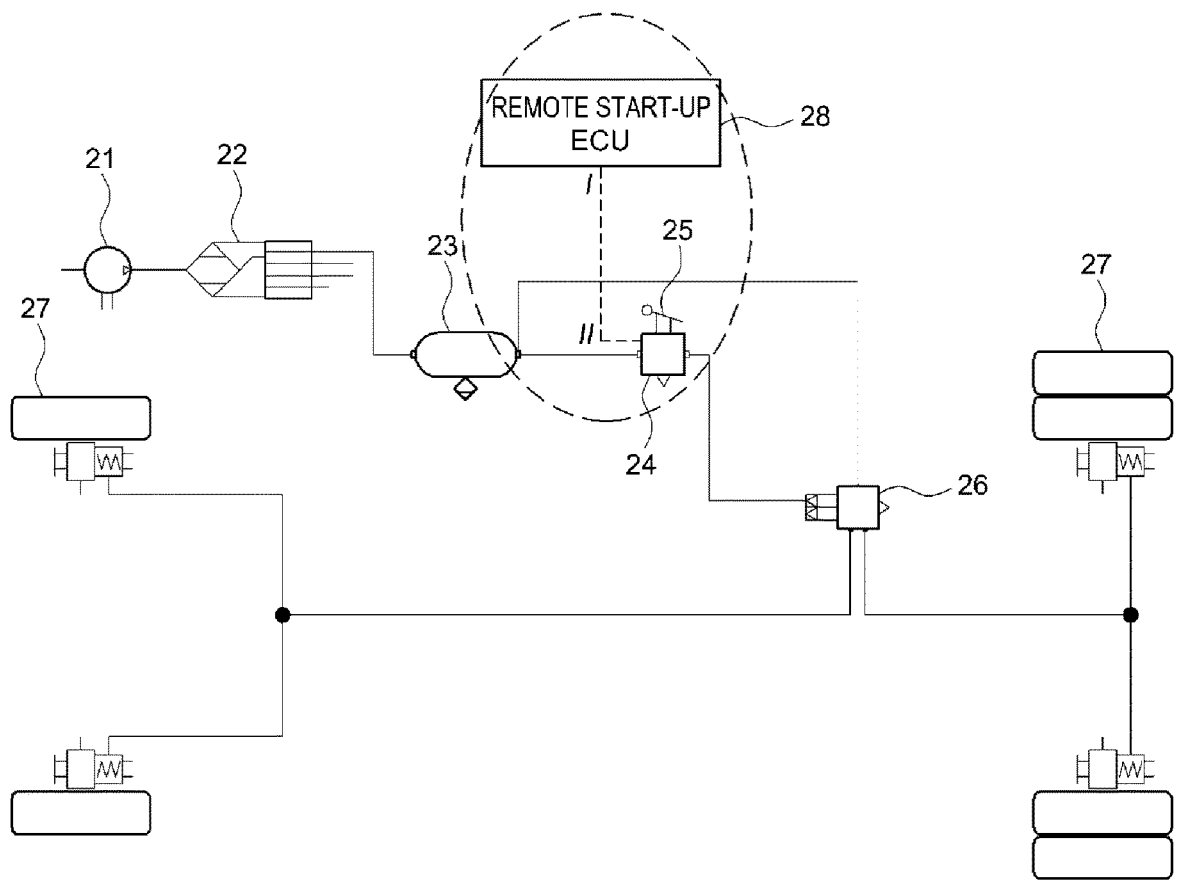
FIG. 2 illustrates a configuration of a parking system according to an exemplary embodiment of the present invention.

FIG. 2 illustrates a configuration of a parking system according to an exemplary embodiment of the present invention. Referring to FIG. 2, a parking system may include an air compressor 21, an air dryer 22, a parking air tank 23, a parking valve 24, a parking lever 25, a relay valve 26, a parking chamber 27, and a remote start-up ECU 28. As an exemplary embodiment of the present invention, the electronic parking valve 24 and the remote start-up ECU 28 may be electrically wired (I-II).

According to the exemplary embodiment of the present invention, the parking system may include an electronic parking valve 24 configured to generate the electrical signal that provides an indication of whether the parking valve is operated based on a position of the parking lever 25 and may be configured to transmit the generated electrical signal to the remote start-up ECU 28. The position of the parking lever 25 may be detected by a sensor. The remote start-up ECU 28 may electrically wired with the electronic parking valve 24 to transmit the electrical signal to the remote start-up ECU 28 and may be configured to determine whether the engine start-up signal is transmitted to the engine ECU operating the engine based on whether the driver receives the remote start-up signal and whether the electrical signal is received from the electronic parking valve 24.

Figure 3A:
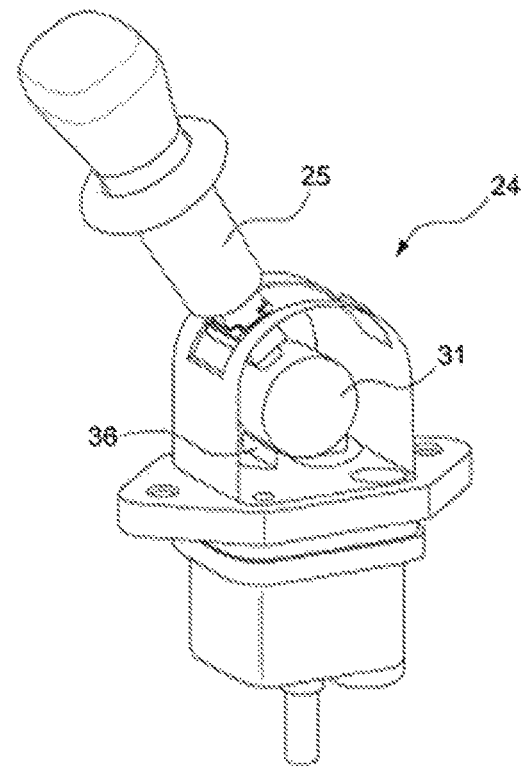
FIG. 3A illustrates an overall configuration of the electronic parking valve according to an exemplary embodiment of the present invention.
Figure 3B:
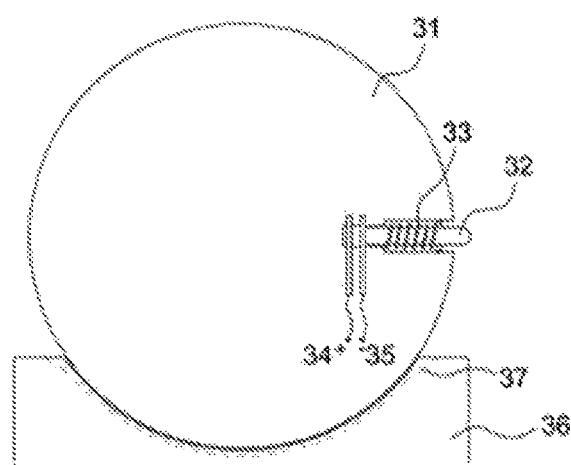
FIG. 3B illustrates configurations of a cam and a cam seat according to an exemplary embodiment of the present invention.
Figure 3C:
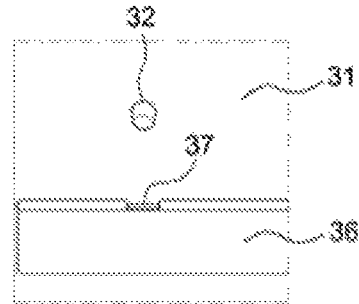
FIG. 3C is a side view of the cam and the cam seat according to an exemplary embodiment of the present invention.

FIGS. 3A-3C illustrate a configuration of an electronic parking valve 24 according to an exemplary embodiment of the present invention and illustrate a parking lever 25 disposed in a parking release position. In particular, FIG. 3A illustrates an overall configuration of the electronic parking valve 24, FIG. 3B illustrates configurations of a cam 31 and a cam seat 36, and FIG. 3C is a side view of the cam 31 and the cam seat 36.

Referring to FIGS. 3A-3C, the electronic parking valve 24 may include a cam 31 and a cam seat 36, and the cam 31 may include a plunger 32, a spring 33, a positive electrode 34, and a negative electrode 35. A plunger guide 37 through which the plunger 32 may pass may be disposed in the cam seat 36. When the parking lever 25 is in the parking release position, the positive electrode 34 and the negative electrode 35 are not in contact with each other, and thus, the electrical signal may not be generated and the electrical signal may not be transmitted to the remote start-up ECU 28.

Figure 4A:
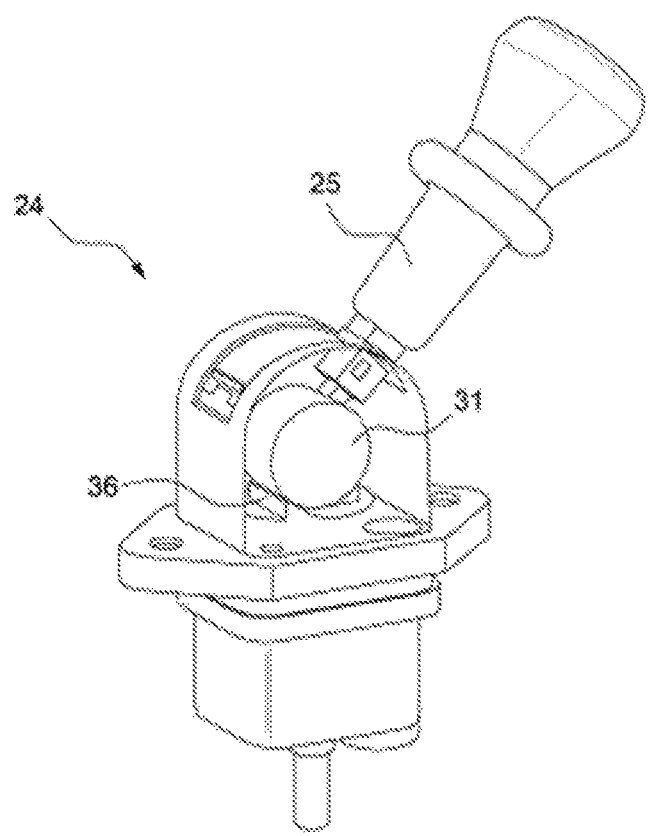
FIG. 4A illustrates the electronic parking valve when the parking lever is in a parking operation position according to an exemplary embodiment of the present invention.
Figure 4B:
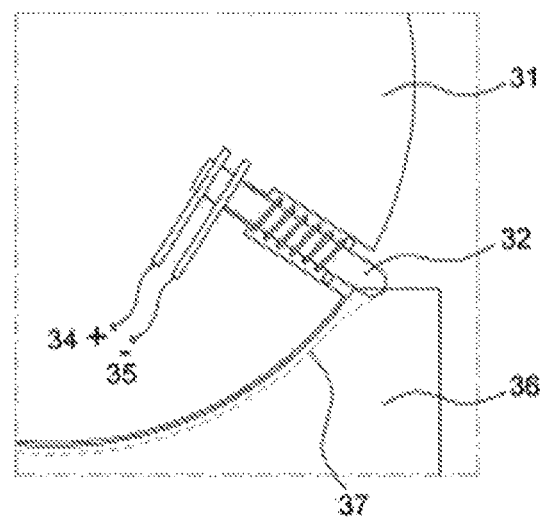
FIG. 4B illustrates the cam and cam seat when the parking lever reaches a middle according to an exemplary embodiment of the present invention.
Figure 4C:
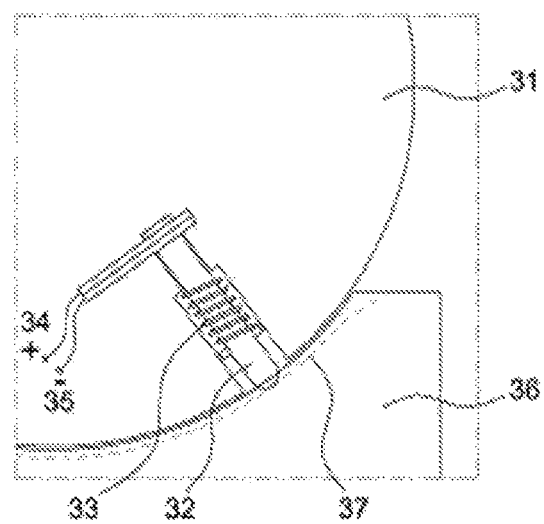
FIG. 4C illustrates the cam and the cam seat when the parking lever is in the parking operation position according to an exemplary embodiment of the present invention.

FIGS. 4A-4C illustrate a process in which an electrical signal is generated in the electronic parking valve 24 by operating the parking lever 25 according to the exemplary embodiment of the present invention. In particular, FIG. 4A illustrates the electronic parking valve 24 when the parking lever 25 is in a parking operation position, FIG. 4B illustrates the cam 31 and cam seat 36 when the parking lever 25 reaches a middle (e.g., a position between a parking operation position and non-parking operation position), and FIG. 4C illustrates the cam 31 and the cam seat 36 when the parking lever 25 is placed in the parking operation position.

According to an exemplary embodiment of the present invention, when the parking lever 25 passes the position in the middle (e.g., a middle portion of the transmission) by moving the parking lever 25 for a parking operation by the driver (e.g., the driver manually moves the parking lever to a parking operation), that is, when the plunger 32 passes through an inlet of the plunger guide 37, the plunger 32 is pressed by the plunger guide 37 and the pressed plunger 32 presses the negative electrode 35 to be in contact with the positive electrode 34 and be electrically conducted, and as a result, the electrical signal is generated and the electrical signal may be transmitted to the remote start-up ECU 28.

According to another exemplary embodiment of the present invention, when the parking lever 25 reaches a fixed position even when the driver removes a hand from the parking lever 25 (e.g., no longer manipulates the lever), the electrical signal may be continuously generated while the driver maintains the position of the lever and the electrical signal may be transmitted to the remote start-up ECU 28. According to the exemplary embodiment of the present invention, when the remote start-up ECU 28 receives the remote start-up signal and the electrical signal, the remote start-up ECU 28 may be configured to transmit the engine start-up signal to the engine ECU.

Although the present invention has been described in detail through the representative exemplary embodiment hereinabove, it will be appreciated that various modifications of the exemplary embodiment of the present invention can be made by those skilled in the art within a limit without departing from the scope of the present invention. Therefore, the scope of the present invention should not be determined to be limited to the exemplary embodiment and should be defined by appended claims to be described below and all changed or modified forms derived from equivalent concepts to the appended claims.

What is claimed is:

1. A method for preventing parking malfunction during remote start-up, comprising:
   determining whether a remote start-up electronic control unit (ECU) receives a remote start-up signal;
   determining whether the remote start-up ECU receives an electrical signal that indicates whether to operate a parking valve based on a position of a parking lever; and
   transmitting, by the remote start-up ECU, an engine start-up signal to an engine ECU.

2. The method of claim 1, wherein when the parking lever is in a parking release position, the electrical signal is not generated.

3. The method of claim 1, wherein when the electrical signal is not generated, the remote start-up ECU does not transmit the engine start-up signal to the engine ECU even in response to receiving the remote start-up signal from a driver.

4. The method of claim 1, wherein when the parking lever is in a parking operation position, the electrical signal is generated and the electrical signal is transmitted to the remote start-up ECU.

5. The method of claim 4, wherein when the remote start-up ECU receives the remote start-up signal and the electrical signal, the remote start-up ECU is configured to transmit the engine start-up signal to the engine ECU.

6. An apparatus for preventing parking malfunction during remote start-up, comprising:
   an electronic parking valve configured to generate an electrical signal indicating whether a parking valve is operated based on a position of a parking lever; and
   a remote start-up electronic control unit (ECU) electrically connected to the electronic parking valve and configured to determine whether to transmit an engine start-up signal to an engine ECU based on whether a remote start-up signal is received from a driver and the electrical signal is received from the electronic parking valve.

7. The apparatus of claim 6, wherein the electronic parking valve includes a cam and a cam seat, and the cam includes a plunger, a spring, a positive electrode, and a negative electrode and a plunger guide through which the plunger is enabled to pass is provided in the cam seat.

8. The apparatus of claim 7, wherein when the parking lever is manually moved for a parking operation and the plunger passes through an inlet of the plunger guide, the plunger is pressed by the plunger guide and the pressed plunger presses the negative electrode to be in contact with the positive electrode and be electrically conducted, to generate the electrical signal and transmit the electrical signal to the remote start-up ECU.

9. The apparatus of claim 8, wherein when the parking lever reaches a position where the parking lever reaches a fixed position, the electrical signal is continuously generated and transmitted to the remote start-up ECU while the parking lever maintains the position.

10. The apparatus of claim 6, wherein when the remote start-up ECU receives the remote start-up signal and the electrical signal, the remote start-up ECU is configured to transmit the engine start-up signal to the engine ECU.

* * * * *